United States Patent
Mori

[11] Patent Number: 5,920,620
[45] Date of Patent: Jul. 6, 1999

[54] CHANNEL ESTABLISHING METHOD OF POINT-TO-MULTIPOINT AND MULTIPOINT-TO-POINT COMMUNICATIONS

[75] Inventor: Naoki Mori, Tokyo, Japan

[73] Assignee: NEC Corporation, Tokyo, Japan

[21] Appl. No.: 08/784,052

[22] Filed: Jan. 17, 1997

[30] Foreign Application Priority Data

Jan. 19, 1996 [JP] Japan .................................. 8-025770

[51] Int. Cl.⁶ .................................................. H04M 3/56
[52] U.S. Cl. ...................... 379/220; 379/205; 379/207; 379/229; 370/408
[58] Field of Search ................... 379/207, 202, 379/205, 219, 220, 221, 229, 230; 370/260, 261, 351, 355, 254, 255, 256, 397, 401, 409, 408

[56] References Cited

U.S. PATENT DOCUMENTS

| | | | |
|---|---|---|---|
| 4,347,498 | 8/1982 | Lee et al. | 370/408 |
| 4,868,814 | 9/1989 | Berkovich et al. | 370/408 |
| 4,987,536 | 1/1991 | Humblet | 370/408 |
| 5,003,532 | 3/1991 | Ashida et al. | 379/205 |
| 5,079,767 | 1/1992 | Perlman | 370/408 |
| 5,210,794 | 5/1993 | Brunsgard | 379/205 |
| 5,245,609 | 9/1993 | Ofek et al. | 370/408 |
| 5,297,197 | 3/1994 | Katz | 379/205 |
| 5,331,637 | 7/1994 | Francis et al. | 370/408 |
| 5,353,412 | 10/1994 | Douglas et al. | 370/408 |
| 5,355,371 | 10/1994 | Auerbach et al. | 370/408 |
| 5,559,876 | 9/1996 | Alperovich | 379/205 |
| 5,583,925 | 12/1996 | Bernstein | 379/205 |
| 5,663,953 | 9/1997 | Maekawa | 370/261 |
| 5,732,071 | 3/1998 | Saito et al. | 370/255 |
| 5,748,626 | 5/1998 | Esaki et al. | 370/355 |

FOREIGN PATENT DOCUMENTS

| | | |
|---|---|---|
| 5-268249 | 10/1993 | Japan . |
| 7-38571 | 2/1995 | Japan . |
| 7-321780 | 12/1995 | Japan . |

OTHER PUBLICATIONS

ATM User–Network Interface Specification (v3.1)– Section 5: UNI Signalling, undated.

*Primary Examiner*—Scott Wolinsky
*Attorney, Agent, or Firm*—Scully, Scott, Murphy & Presser

[57] ABSTRACT

A communication channel establishing method by which point-to-multipoint or multipoint-to-point connections by a communication network which includes exchanges (switches) can be established at a high speed. When a connection establishment request designating called users 11, 12 and 13 is received from calling user 10, switch 100 retrieves routes to the individual called users and selects switch 102 in the next stage and sends out a connection establishment request to switch 102 designating called users 11, 12 and 13. Switch 102 further retrieves routes to the individual called users and selects switch 103 for called users 11 and 12, but selects switch 104 for called user 13. Then, switch 102 sends out connection establishment requests to switches 103 and 104 individually designating the relevant called users. Any connection establishment request received from a switch of the preceding stage is successively repeated to a selected switch in the next stage until each called user is reached.

3 Claims, 3 Drawing Sheets

CHANNEL ESTABLISHING METHOD OF POINT-TO-MULTIPOINT AND MULTIPOINT-TO-POINT COMMUNICATIONS

BACKGROUND OF THE INVENTION

1. Field of the Invention

This invention relates to a communication channel establishing method for a communication network which includes a plurality of communication terminals, a plurality of exchanges and a transmission line, and more particularly to a channel establishing method of point-to-multipoint communication.

2. Description of the Related Arts

In a communication network which includes a plurality of exchanges, in order to realize data transfer of a high degree of reliability between calling and called terminals, a connection is established for a communication channel between the calling and called terminals prior to transfer of data. A control procedure to establish a connection is generally called signaling system or signaling, and one of conventional communication systems for realizing point-to-multipoint or multipoint-to-point communication is point-to-multipoint signaling.

A representative one of conventional point-to-multipoint communication systems mentioned above is, for example, a point-to-multipoint connection establishing method for an ATM (Asynchronous Transfer Mode) communication network (refer to ATM Forum UNI (User Network Interface) 3.1).

FIG. 1 is a view illustrating the conventional point-to-multipoint connection establishing method defined in the ATM Forum UNI Signaling 3.1. This establishing method can be applied to a communication network wherein calling terminal 30 and called terminals 31 and 32 are connected to each other via exchanges 300 to 304. In the following description, each communication terminal is referred to as user, and each exchange is referred to as switch.

Referring to FIG. 1, a procedure when calling user 30 establishes a one (calling user) to two (called users) connection to called users 31 and 32 in accordance with the conventional point-to-multipoint connection establishing method defined in the ATM Forum UNI Signaling 3.1.

Calling user 30 sends out a point-to-multipoint connection establishing request consisting of two stages to the communication network. In the first stage request, only first called user 31 is designated. This request is first received by switch 300 in which calling user 30 is accommodated (step C1).

Receiving the request sent out from calling user 30 in step C1, since called user 31 is not accommodated in switch 300, switch 300 selects a route optimum for establishment of a connection to called user 31 and sends out the request to switch 301 in the next stage within the selected route (step C2).

When the request sent out from switch 300 in step C2 is received by switch 301, since called user 31 is not accommodated in switch 301, switch 301 selects a route optimum for establishment of a connection to called user 31 and sends out the request to switch 303 in the next stage within the selected route (step C3).

When the request sent out from switch 301 in step C3 is received by switch 303, since called user 31 is accommodated in switch 303, switch 303 sends out the request to called user 31 (step C4).

Receiving the request sent out from switch 303 in step C4, called user 31 first establishes a connection to switch 303 and then sends out a connection establishment completion message to switch 303 (step C5).

Receiving the connection establishment completion message from called user 31 in step C5, switch 303 establishes a connection between switch 303 and switch 301 and then sends out a connection establishment completion message to switch 301 (step C6).

Receiving the connection establishment completion message from switch 303 in step C6, switch 301 first establishes a connection to switch 300 and then sends out a connection establishment completion message to switch 300 (step C7).

Receiving the connection establishment completion message from switch 301, switch 300 first establishes a connection to calling user 30 and sends out a connection establishment completion message to called user 31 to calling user 30 (step C8).

Receiving the connection establishment completion message to called user 31 from switch 300 in step C8, calling user 30 sends out a second stage request requesting to add another connection to the connection established by the processing in steps C1 to C8 described hereinabove to switch 300 and designates second called user 32 in this second request (step C9).

When the request sent out from calling user 30 in step C9 is received by switch 300, since called user 32 is not accommodated in switch 300, switch 300 selects a route optimum for establishment of a connection to called user 32 and sends out the request to switch 301 in the next stage within the selected route (step C10).

When the request sent out from switch 300 in step C10 is received by switch 301, since called user 32 is not accommodated in switch 301, switch 301 selects a route optimum for establishment of a connection to called user 32 and sends out the request to switch 304 in the next stage which is within the selected route (step C11).

Receiving the request sent out from switch 301 in step C11, since called user 32 is accommodated in switch 304, switch 304 sends out the request to called user 32 (step C12).

Receiving the request sent out from switch 304 in step C12, called user 32 establishes a connection to switch 304 and then sends out a connection establishment completion message to switch 304 (step C13).

Receiving the connection establishment completion message sent out from the called user in step C13, switch 304 establishes a connection between switch 304 and switch 301 and then sends out a connection establishment completion message to switch 301 (step C14).

When the connection establishment completion message sent out from switch 304 in step C14 is received by switch 301, since the connection was established already between switch 300 and switch 301 in step C7, switch 301 does not establish a new connection, but is set so that data sent from switch 300 to switch 301 upon data transmission may be distributed simultaneously to switch 303 and switch 304. Thereafter, switch 301 sends out a connection establishment completion message to switch 300 (step C15).

When the connection establishment completion message sent out from switch 301 in step C15 is received by switch 300, since the connection was established already between switch 300 and calling user 30 in step C8, switch 300 does not establish a new connection, but sends out a connection establishment completion message to called user 32 to calling user 30 (step C16).

After such one (calling user) to two (called users) connection as seen in FIG. 1 is established in accordance with the series of steps C1 to C16 described above, one data sent from calling user 30 upon data transmission is copied by switch 301 which serves as a branching point of the connection and finally reaches two called users 31 and 32.

It is to be noted that a one (calling user) to N (called users) connection can be established with contents of similar steps by repeating steps C9 to C16 described above by N−1 times adding to the steps of C1 to C8.

However, the conventional point-to-multipoint or multipoint-to-point connection establishing method described above has a problem in that, since establishment of a connection is performed sequentially for each one called user, an increasing time is required to complete the establishment in proportion to the number of calling/called users. For example, in the communication network shown in FIG. 1, establishment of a connection to called user 32 cannot be started before a connection to called user 31 is established.

SUMMARY OF THE INVENTION

It is an object of the present invention to provide a channel establishing method of point-to-multipoint communication which reduces the time required for establishment of a point-to-multipoint or multipoint-to-point connection to realize high speed establishment of the connection by allowing, upon establishment of a connection between a plurality of calling and called users, a plurality of switches forming a communication network to perform establishment of connections simultaneously and parallel to each other.

In order to attain the object described above, according to an aspect of the present invention, there is provided a channel establishing method of point-to-multipoint communication, comprising the requesting step of requesting, from an arbitrary terminal to an exchange in which the terminal is accommodated, designating terminals as one terminal and multiple terminals, a connection construction between the one terminal and the multiple terminals, the step of transferring, from the exchange which receives the connection request, information of a point-to-multipoint connection to a first one exchange which accommodates one of the designated terminals, the connection establishment instructing step of selecting, by the first exchange, based on the point-to-multipoint connection information, an exchange in a next stage intervening for connection of each terminal and instructing the selected exchanges for connection establishment designating all terminals which make objects of connection of the exchange, the exchange connecting step for repeating the connection establishment instructing step for each of the terminals to establish a tree-like connection until an accommodating exchange in which the connection object terminals to which the terminals are to be connected are accommodated is reached, the terminal connecting step of calling and connecting the connection object terminals individually from the accommodating exchanges, and the step of extending, in response to completion of the connections of the terminals, the connections of the channels to the upper connection stages to establish all channels between the multiple terminals and the one terminal, thereby to establish the communication channels between the requested point-to-multipoint terminals.

In a point-to-multipoint connection, preferably the terminal which requests for the connection construction is a calling terminal as the designated one terminal and all of the designated multiple terminals are called terminals. On the other hand, in a multipoint-to-point connection, preferably the terminal which requests for the connection construction is one of calling side multiple terminals of the point-to-multipoint connection construction and the number of called terminals is 1.

According to another aspect of the present invention, there is provided a channel establishing method of point-to-multipoint communication, comprising the connection establishment requesting step of requesting, from one calling terminal, a first exchange which accommodates the calling terminal therein for establishment of point-to-multipoint communication channels designating a plurality of called terminals, the connection establishment instructing step of instructing, by the first exchange which retrieve the route to the called terminals, connection establishment request and sending out connection establishment requests designating all of the called terminals to be connected individually for each selected exchanges, and the step of successively repeating, by each of the exchanges connected to the next stage to the first exchange, the connection establishment request received from any exchange of the preceding stage to selected exchanges of a next stage until the plurality of called terminals are reached.

According to a further aspect of the present invention, there is provided a channel establishing method of point-to-multipoint communication, comprising the connection establishment requesting step of requesting, from one of a plurality of calling terminals, a first exchange in which the calling terminal is accommodated for construction of connections of multipoint-to-point communication channels designating a plurality of calling terminals and one called terminal, the calling terminal connection instructing step of instructing, by the first exchange which retrieves the routes to the designated terminals, the connection establishment request, routes to the plurality of called terminals, selection exchanges in a next stage for establishment of connections individually for the retrieved routes and sending out connection establishment requests designating calling terminals to be connected individually for each of the selected exchanges, the called terminal connection instructing step of retrieving, by the first exchange, a route to the one called terminal, selecting an exchange of a next stage for establishment of a connection for the retrieved route and sending out a connection establishment request designating the one called terminal to the selected exchange, the step of successively repeating, by the exchanges in the next stage to the first exchange, the connection establishment request received from any exchange in the preceding stage to the selected exchange in the next stage until the plurality of calling terminals and the called terminal are reached, and the step of connecting, by the first exchange, the calling terminals to the channels to the called terminal.

Preferably, the designation of any terminal is a terminal selection number.

DESCRIPTION OF THE PREFERRED EMBODIMENTS

Embodiments of the present invention are described below with reference to the accompanying drawings.

Figure 1:
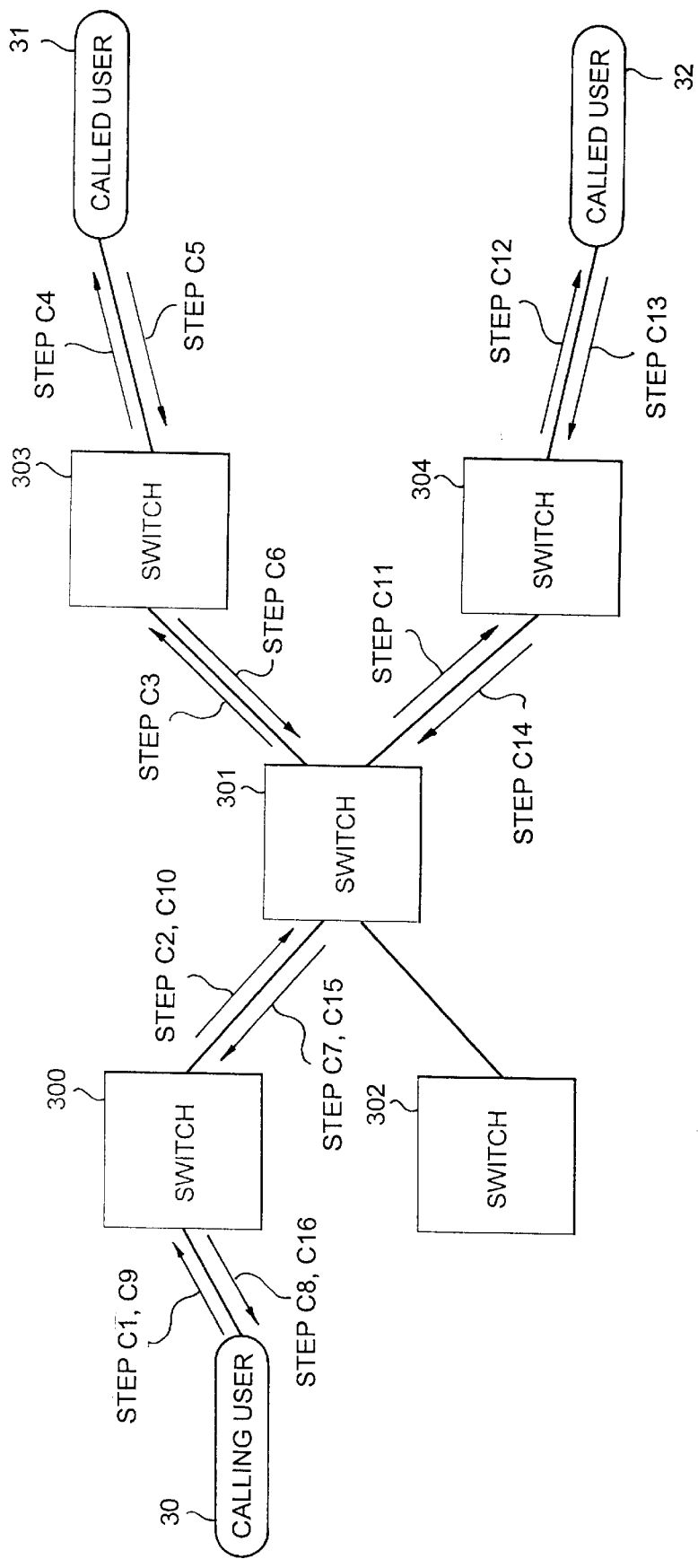
FIG. 1 is a diagrammatic view illustrating a conventional channel establishing method of point-to-multipoint communication.
Figure 2:
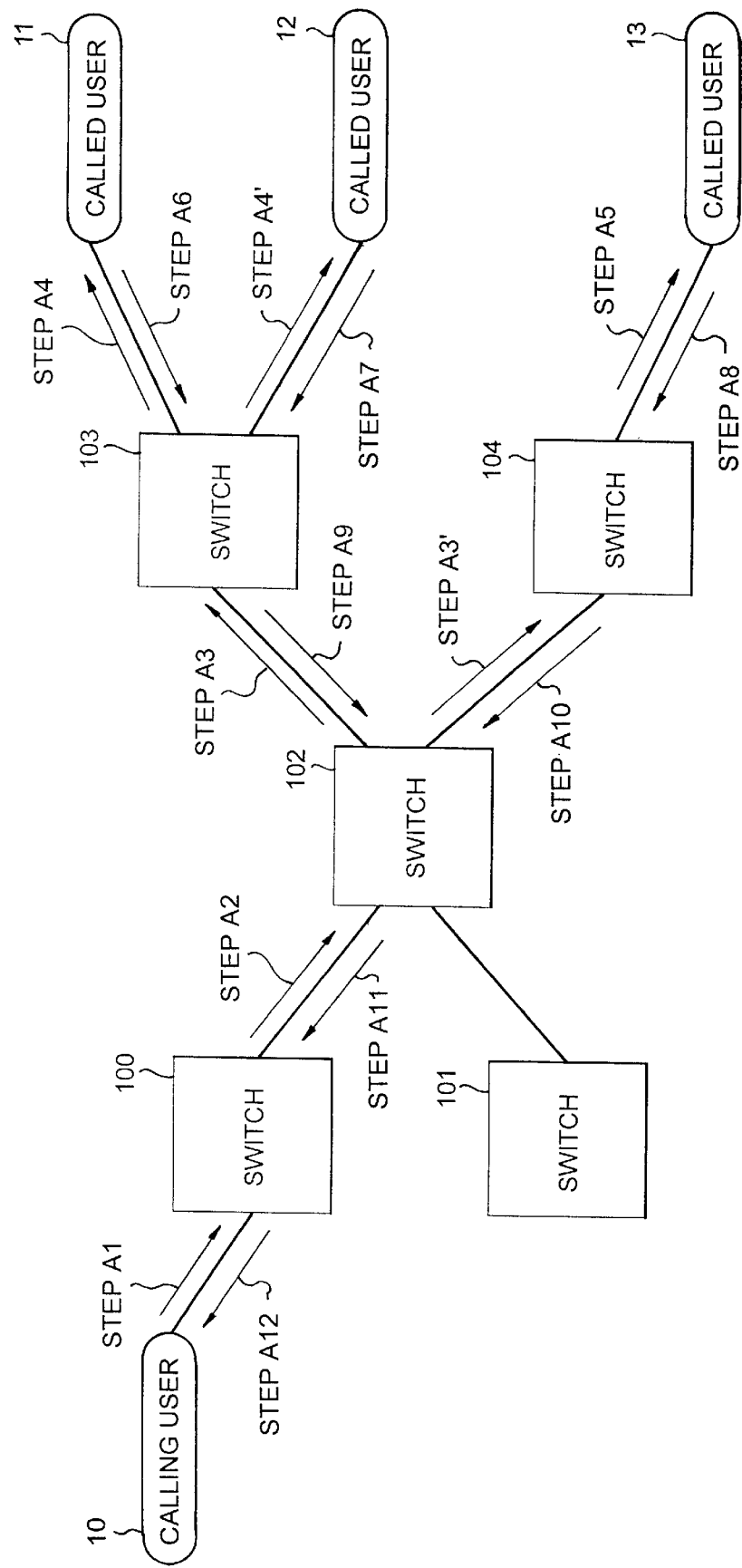
FIG. 2 is a diagrammatic view illustrating a first embodiment of a channel establishing method of point-to-multipoint communication of the present invention.

FIG. 2 is a diagrammatic view illustrating a first embodiment of a channel establishing method of point-to-multipoint communication of the present invention. The channel establishing method of point-to-multipoint communication of the present embodiment is applied to a communication network wherein calling user 10 and called users 11, 12 and 13 are connected to each other via switch 100 to 104. First, calling user 10 sends out a one-to-three connection establishment request in a predetermined code to switch 100. The request includes a designation of called users 11, 12 and 13 (step A1).

Switch 100 retrieves switches in the next stage for the individual called users in response to the request in step A1. Since the switches in the next stage for called users 11, 12 and 13 are switch 102, a connection establishment request which designates called users 11, 12 and 13 is sent out from switch 100 to switch 102 (step A2).

Receiving the connection establishment request in step A2, switch 102 retrieves switches of the next stage for establishment of a connection to the received users. As a result, switch 102 selects switch 103 for called users 11 and 12, switch 104 for called user 13, and sends out a connection establishment request to called users 11 and 12 to switch 103, and another connection establishment request to called user 13 to switch 104 (steps A3 and A3').

Switch 103 retrieves switches of the next stage for establishment of a connection to called users 11 and 12 in response to the request of step A3. As a result, switch 103 recognizes that the two users are accommodated in switch 103 itself, and directly establishes connections to them (steps A4 and A4').

Switch 104 retrieves, upon reception of the establishment request in step A3', a switch in the next stage for connection to called user 13. As a result, switch 104 recognizes that called user 13 is a user accommodated in switch 104 itself, and directly establishes a connection to called user 13 (step A5).

As a result of the connection establishment in step A4, called user 11 sends out a receiving connection establishment completion signal to switch 103 (step A6).

As a result of the connection establishment in step A4', called user 12 sends out a receiving connection establishment completion signal to switch 103 (step A7).

As a result of the connection establishment in step A5, called user 13 sends out a receiving connection establishment completion signal to switch 104 (step A8).

Receiving the establishment completion signals from called users 11 and 12 in steps A6 and A7, respectively, switch 103 sets a connection to transfer received data from switch 102, such that data may be transmitted to called users 11 and 12. Thereafter, switch 103 establishes a connection to switch 102 and sends out a connection establishment completion message to switch 102 (step A9).

Receiving the connection establishment completion signal from called user 13 in step A8, switch 104 establishes a connection to switch 102 and sends out a connection establishment completion message to switch 102 (step A10).

Receiving the connection establishment completion messages from switches 103 and 104, switch 102 sets itself a connection to transfer received data from switch 100 to switches 103 and 104, and sends out a connection establishment completion message to switch 100 (step A11).

Receiving the connection establishment completion message to switch 102 in step A11, switch 100 establishes a connection to calling user 10 and sends out a connection establishment completion message to calling user 10 (step A12).

After such a one-to-three connection as shown in FIG. 2 is established by steps A1 to A12, data transmitted from calling user 10 are branched by switches 102 to 104 so that it is finally received by called users 11, 12 and 13 simultaneously.

A second embodiment is described below.

Figure 3:
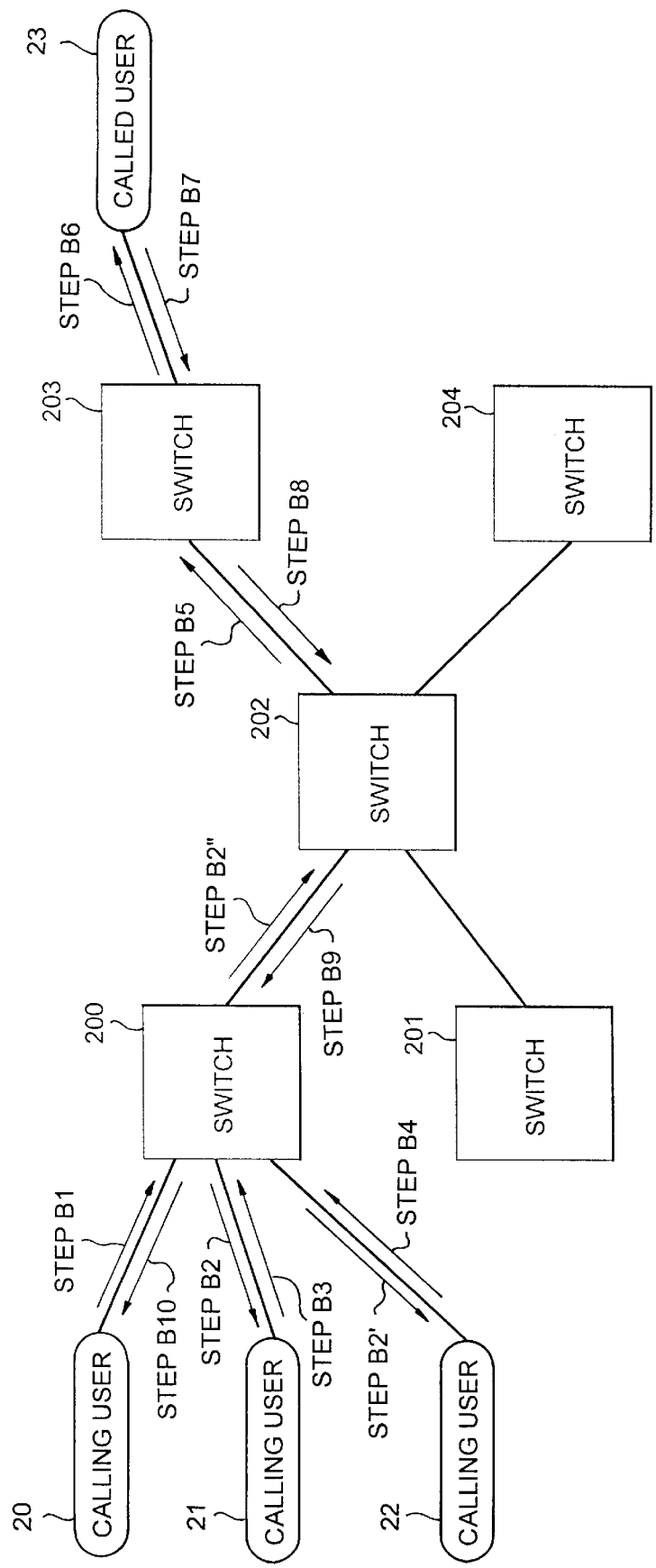
FIG. 3 is a diagrammatic view illustrating a second embodiment of a channel establishing method of point-to-multipoint communication of the present invention.

FIG. 3 is a diagrammatic view illustrating a channel establishing method of multipoint-to-point communication as a second embodiment of the present invention.

The channel establishing method of multipoint-to-point communication is applied to a communication network wherein calling users 20, 21 and 22 and called user 23 are connected to each other via switches 200 to 204.

A procedure for establishment of connections from calling users 20, 21 and 22 to called user 23 is described below with reference to FIG. 3.

Calling user 20 sends out a three-to-one connection establishment request designating calling users 20, 21 and 22 to called user 23 by a predetermined code to switch 200 (step B1).

Receiving the request sent out from calling user 20, switch 200 retrieves and selects switches in the next stage for establishment of connections to the calling users and the called user. Since calling users 20, 21 and 22 are all connected directly to switch 200, no switch of the next stage is selected. For called user 23, switch 202 is selected. Switch 200 sends out a connection establishment request to switch 200 calling users 21 and 22 and simultaneously sends out a connection establishment request designating called user 23 to switch 202 (steps B2, B2' and B2").

Receiving the connection establishment request in step B2, calling user 21 establishes a connection to switch 200 and sends out a connection establishment completion message to switch 200 (step B3).

When the connection establishment request by step B2' is received, calling user 22 establishes a connection to switch 200 and sends out a connection establishment completion message to switch 200 (step B4).

Receiving the connection establishment request sent out from switch 200 in step B2", switch 202 retrieves and selects a stage in the next stage for establishment of a connection to called user 23. As a result, switch 202 selects switch 203 and sends out a connection establishment request designating called user 23 to switch 203 (step B5).

Receiving the connection establishment request from switch 202 by step B5, switch 203 retrieves and selects a switch in the next stage for establishment of a connection to called user 23. Since switch 203 accommodates called user 23 therein, no switch in the next stage is selected, and a connection establishment request is send out directly from switch 203 to called user 23 (step B6).

Receiving the connection establishment request from switch 203 by step B6, called user 23 establishes a connection to switch 203 and sends out a connection establishment completion message to switch 203 (step B7). Receiving the connection establishment request from called user 23 by step B7, switch 203 establishes a connection to 202 and sends out a connection establishment completion message to switch 202 (step B8).

Receiving the connection establishment completion message from switch 203 by step B8, switch 202 establishes a connection to 200 and sends out a connection establishment completion message to switch 200 (step B9).

When the connection establishment completion messages sent out from calling users 21 and 22 and called user 23 by steps B3, B4 and B9, switch 200 sets itself connections to transfer the data transmitted from any of calling users 20, 21 and 22 to switch 202. Thereafter, switch 200 establishes a connection between switch 200 and calling user 20 and sends out a connection completion message to calling user 20 (step B10).

After the three-to-one connection illustrated in FIG. 3 is established in accordance with steps B1 to B10 as described above, called user 23 receives data transmitted from any of calling users 20, 21 and 22. The requests for establishment of point-to-multipoint and multipoint-to-point connection are called by terminals having no relation to the connection according to a predetermined code format, the request can be transfered to a switch accommodating the representative terminals such as user 10 in FIG. 2 and user 20 in FIG. 3 to establish the requested connection thereof.

While several embodiments of the present invention are described above, the present invention is not limited to those embodiments, and various forms which are based on the principle of the present invention fall within the scope of the present invention.

What is claimed is:

1. A channel establishing method of multipoint-to-point communication which establishes a connection between one terminal and a plurality of terminals in a communication network in which a plurality of terminals are connected via a plurality of exchanges, comprising the steps of;

sending, from one of a plurality of calling terminals, to a home exchange in which the calling terminal is accommodated, a request for a connection establishment of multipoint-to-point communication channels designating a plurality of calling terminals and one called terminal;

retrieving by the home exchange, routes to the plurality of calling terminals to select exchanges in a next stage of each route;

instructing, by the home exchange to selected exchanges in a next stage, the connection establishment for each individual route designating calling terminals to be connected individually for each of the selected exchanges;

retrieving by the home exchange a route to the called terminal to select an exchange in a next stage of the route;

instructing, by the home exchange to a selected exchange in a next stage, the connection establishment within the retrieved route designating the called terminal to be connected to the selected exchanges;

successively repeating the retrieving steps and the instructing steps for one or more subsequent stages until reaching the exchanges accommodating the designated plurality of calling terminals respectively and the exchange accommodating the called terminal;

connecting to the designated terminals individually from the respective accommodating exchanges;

extending, in response to completion of the connections of the terminals, the connections of the channels to a plurality of intervening connection stages; and connecting, by the home exchange, the calling terminals to the called terminal via the channels.

2. A channel establishing method as claimed in claim 1, wherein the designation of any terminal is a terminal selection number.

3. A channel establishing method of point-to-multipoint communication which establishes a connection between one calling terminal and a plurality of called terminals in a communication network in which said terminals are connected via a plurality of exchanges, comprising the steps of:

(a) requesting a connection establishment from a calling terminal to a plurality of called terminals, the request being received by a first exchange in a first stage, the request containing point-to-multipoint information designating the plurality of called terminals;

(b) retrieving routes and selecting exchanges in a next stage based on the retrieved routes for establishing a connection from the calling terminal to each of the called terminals based on the point-to-multipoint information;

(c) repeating step (b) for one or more subsequent stages until reaching all exchanges that accommodate the plurality of called terminals;

(d) connecting to the called terminals individually from the accommodating exchanges;

(e) sending a connection completion signal to all of the selected exchanges and the first exchange; and (f) establishing a connection from the calling terminal to the first exchange and through all of the selected exchanges to the called terminal for sending data from the calling terminal to the called terminals simultaneously.

* * * * *